United States Patent [19]
Kuwahara et al.

[11] Patent Number: 4,478,643
[45] Date of Patent: Oct. 23, 1984

[54] BASE COMPOSITION COMPRISING AN IRRADIATED ORGANIC PIGMENT

[75] Inventors: Tosihide Kuwahara, Habikino; Mituo Kiboku, Kamo; Seisiro Ito, Ikoma; Tatuhiko Ihara, Kure; Shoji Ikeda, Hirakata, all of Japan

[73] Assignees: Gakko Hojin Kinki Daigaku; Nippon Paint Co., Ltd., both of Osaka, Japan

[21] Appl. No.: 502,686

[22] Filed: Jun. 9, 1983

[30] Foreign Application Priority Data

Jun. 11, 1982 [JP] Japan ................................ 57-101025

[51] Int. Cl.$^3$ ............................................... C09D 7/14
[52] U.S. Cl. ........................... 106/288 Q; 106/308 Q; 204/165; 523/200
[58] Field of Search .................... 204/165; 106/288 Q, 106/308 Q; 427/40, 41; 523/200

[56] References Cited

U.S. PATENT DOCUMENTS 3,676,350  7/1972  Wright et al. ................. 204/165 X
4,072,769  2/1978  Lidel ............................... 204/165 X
4,311,828  1/1982  Imada et al. .................... 204/165 X Primary Examiner—G. L. Kaplan
Attorney, Agent, or Firm—Wenderoth, Lind & Ponack

[57] ABSTRACT

A pigment-containing base composition comprising at least one organic pigment irradiated with low-temperature plasma and at least one polar resin or solvent, which has good dispersibility.

10 Claims, No Drawings

BASE COMPOSITION COMPRISING AN IRRADIATED ORGANIC PIGMENT

The present invention relates to a pigment-containing base composition. More particularly, it relates to a pigment-containing base composition comprising an organic pigment treated with low-temperature plasma.

Recently, many organic pigments of high qualities, for example, sharpness, tinting strength, transparency, fastness, etc. have been developed and are available on the market. These organic pigments are non-polar at the surfaces of their particles and have poor miscibility with or dispersibility in solid or liquid vehicles. Because of this reason, their uniform mixing or dispersing with solid or liquid vehicles can be attained only by application of large energy, e.g. using a special mixing machine with a strong shear force, over a long time.

In order to overcome the above disadvantage, an attempt has been made to impart a polarity to the surfaces of the particles of organic pigments, for instance, by a conventional wet surface treatment procedure. However, it is difficult to treat only the skin layers at the surfaces by such procedure. Thus, the core portions of the particles are readily affected by such operation so that the favorable properties inherent to the organic pigments such as good fastness may be deteriorated. Further, the procedure requires considerable energy and time for post-treatment such as drying.

As a result of extensive study, it has now been found that the application of plasma surface treatment to an organic pigment can successfully impart a favorable polarity to the surfaces of the particles of such organic pigment without any drawback as seen in the conventional wet surface treatment procedure, and the resulting particles are easily miscible with or dispersible in a solid vehicle (e.g. a resin) or a liquid vehicle (e.g. a solvent) by a simple operation to give a uniform pigment-containing base composition.

The plasma to be applied in the present invention is low-temperature plasma. As well known, plasma is a gas of which the molecule is in an electrically dissociated (i.e. ionized) state. This dissociation state can be produced by the use of high temperatures of several thousands to several ten thousands degrees centigrade, which is called "high-temperature plasma", or maintained by any procedure other than high temperatures, which is called "low-temperature plasma". In the low-temperature plasma, plasma is produced usually at a temperature of not more than about 800° C. [Journal of The Adhesion Association of Japan, Vol. 15, No. 2, pages 46-52 (1979): "Modification of Surfaces of Organic Materials by Plasma" (in Japanese)]. In this invention, plasma may be produced at such temperature or sometimes even at a low temperature of about 400° C. or lower. As the electric source for production of low-temperature plasma, there may be used high frequency, microwave, alternating current, direct current, etc. Examples of the mode of electrical discharge are glow discharge by induction loading or capacity loading, corona discharge, boxer charger, etc.

The plasma surface treatment may be carried out by application of low-temperature plasma to the particles of the organic pigment using a conventional plasma irradiating equipment. Examples of the gas for the plasma include reactive or non-reactive gases such as air, hydrogen, oxygen, ammonia, carbon dioxide, carbon tetraflouride, nitrogen, argon, helium, etc. These gases may be employed alone or in a mixture. When application is made under a reduced pressure, the pressure in the treatment chamber may be kept from 0.01 to 10 mmHg, preferably from 0.05 to 5 mmHg. When application is made under atmospheric pressure, the particles of the pigment may be directly contacted with the air or any other gas. Preferably, the pigment particles are agitated during the application so as to assure even and homogeneous irradiation. The time for application may be appropriately set taking into consideration the kind of the plasma gas, the output of the plasma, the kind of the pigment, etc. insofar as any unfavorable influence is not produced on the properties of the pigment such as color and weather resistance.

The pigment to be treated may be any organic pigment usable in the industries of paint, ink, plastics, etc. Examples of the pigment are azo-pigments (e.g. "Irgazine Red LT" manufactured by Ciba Ltd.; "Novaperm Yellow H10G" manufactured by Hoechst; "Monolite Red BR" manufactured by ICI), polycondensed azo-pigments (e.g. "Chromophthal Red A2B" manufactured by Ciba Ltd.; "Monolite Yellow 4G" manufactured by ICI), metal-complex azo-pigments (e.g. "Irgazine Yellow 5GT" manufactured by Ciba Ltd.; "Pariotol Yellow 1770" manufactured by BASF), benzimidazolone pigments (e.g. "Phostaperm Yellow H3G" manufactured by Hoechst; "Phostaperm Orange HL70" manufactured by Hoechst; "Novaperm Orange HL" manufactured by Hoechst), quinacridone pigments (e.g. "Cinquasia Red Y" manufactured by du Pont; "Cinquasia Violet" manufactured by du Pont; "Phostaperm Red" manufactured by Hoechst; "Pariogen Red" manufactured by BASF; "Monolite Violet" manufactured by ICI), isoindolinone pigments (e.g. "Irgazine Yellow 2RLT" manufactured by Ciba Ltd.; "Pariotol Yellow 2140HD" manufactured by BASF), quinophthalone pigments (e.g. "Pariotol Yellow 0960HD" manufactured by BASF), perinone pigments (e.g. "Phostaperm Orange GR" manufactured by Hoechst), perylene pigments (e.g. "Irgazine Red BPT" manufactured by Ciba Ltd.; "Novaperm Red BL" manufactured by Hoechst; "Pariogen Red 3910" manufactured by BASF), dioxazine pigments (e.g. "Chromophthal Violet" manufactured by Ciba Ltd.; "Phostaperm Violet RL" manufactured by Hoechst), phthalocyanine pigments (e.g. "Chromophthal Blue 4GN" manufactured by Ciba Ltd.; "Phostaperm Blue B3G" manufactured by Hoechst; "Cinquasia Blue GF" manufactured by du Pont; "Chromophthal Green GF" manufactured by Ciba Ltd.; "Phostaperm Green GG" manufactured by Hoechst; "Cinquasia B" manufactured by du Pont), thioindigo pigments (e.g. "Novaperm Red Violet MRS" manufactured by Hoechst; "Thiofast Red MVE6606" manufactured by BASF), anthraquinone pigments (e.g. "Chromophthal Red A3B" manufactured by Ciba Ltd.), flavanthrone pigments (e.g. "Chromophthal Yellow A2R" manufactured by Ciba Ltd.; "Monolite Yellow FR" manufactured by ICI), indanthrene pigments (e.g. "Chromophthal Blue A3R" manufactured by Ciba Ltd.; "Monolite Blue 3R" manufactured by ICI; "Threne Blue 6011" manufactured by Dainippon Ink and Chemicals, Inc.), anthrapyridine pigments (e.g. "Pariogen Yellow 1560" manufactured by BASF), anthanthrone pigments (e.g. "Monolite Red 2Y" manufactured by ICI; "Monolite Red Y" manufactured by ICI; "Phostaperm Scarlet GO" manufactured by Hoechst), pyranthrone pigments (e.g. "Pariogen Red 3530" manufactured by BASF), etc.

The pigment-containing base composition of the invention comprises, as the essential components, at least one organic pigment provided with a polarity by plasma surface treatment as above, and at least one solid or liquid vehicle having a polarity uniformly mixed therewith.

The term "polarity" as hereinabove stated is intended to mean any property attributed to any polar group such as carboxyl, carbonyl, nitro, hydroxyl, amino, amide, halogen, ester or ether. Examples of the resin as the solid vehicle having a polarity are polyester resins, alkyd resins, vinyl resins (including acrylic resins), urethane resins, epoxy resins, polyamide resins, melamine resins, urea resins, etc. Examples of the solvent as the liquid vehicle having a polarity are alcohols (e.g. methanol, butanol), esters (e.g. ethyl acetate, butyl acetate), ketones (e.g. methyl ethyl ketone, methyl isobutyl ketone), 2-nitropropane, methylene chloride, dimethylformamide, water, etc.

The composition of the invention may further comprise, as optional component(s), at least one non-polar organic pigment and/or at least one non-polar solid or liquid vehicle such as a resin (e.g. polystyrene, polybutadiene, polyethylene) or a solvent (e.g. benzene, toluene, xylene, "Solvesso" (hydrocarbon mixtures; manufactured by Esso Standard Oil), "Swasol" (hydrocarbon mixtures; manufactured by Maruzen Oil)).

When the content of the plasma-irradiated and polar pigment is from 0.5 to 60% by weight on the basis of the weight of the composition, the pigment can be well dispersed in the vehicle. When the non-polar pigment is added to the composition, its content is to be not more than 90% by weight on the basis of the combined weight of the irradiated and polar pigment and the non-polar pigment, because otherwise the dispersing effect is not sufficient.

Mixing or dispersing of the essential and optional components may be carried out by the use of a conventional mixing machine (e.g. sand grinding mill, high speed disperser, roll mill, planetary mixer, ball mill).

The base composition of the invention may be diluted with any solid or liquid vehicle such as a resin and/or a solvent to prepare a final product such as paint, ink and plastic goods for immediate use. The solid or liquid vehicle for dilution may be the same one as used in the preparation of the base composition of the invention.

The base composition or the final product using such base composition maintains a good dispersion state and shows excellent performances in gloss, viscosity, etc. A paint or ink composition prepared by the use of the base composition shows good flowability and workability. The coating film or shaped product prepared by the use of the composition gives good physical properties, particularly in gloss, sharpness, hardness, elasticity, mechanical strength, weather resistance, etc. In order to exert these favorable properties, the content of the plasma irradiated pigment in the product is preferred to be not less than 10% by weight of the total weight of the pigments included in the product.

Practical and presently preferred embodiments of the present invention are shown in the following Examples, wherein parts and % are by weight unless otherwise indicated.

EXAMPLE 1

An organic pigment "Cinquasia Red Y" (manufactured by du Pont) was irradiated with low-temperature plasma by means of a plasma incineration equipment Model "LTA-4SN" (manufactured by Yanagimoto Seisakusho K.K.). Radio frequency of 13.56 MHz was applied to create plasma of 10 W under a pressure of 1.0 mm Hg in a stream of air with a flow rate of 100 ml/min, and the pigment was irradiated for 120 minutes. A mixture of the plasma irradiated pigment (20 parts), coconut oil-modified alkyd resin (acid value, 8; hydroxyl value, 80; solid content 60%) (40 parts) and a solvent "Solvesso" (manufactured by Esso Standard Oil) (40 parts) were ground by means of an SG mill for 3 hours to obtain a grinding paste.

For comparison, a grinding paste was prepared in the same manner as above but using "Cinquasia Red Y" which had not been irradiated with plasma, in place of the plasma irradiated pigment.

The viscosity of each grinding paste was measured by means of a corn-plate type viscometer "E-type" (manufactured by Tokyo Keiki K.K.). The results are shown in Table 1.

TABLE 1

|  | Viscosity[*1] (cp) | Viscosity[*2] (cp) | Viscosity[*1]/Viscosity[*2] |
|---|---|---|---|
| Plasma irradiated pigment | 200 | 182 | 1.1 |
| Non-irradiated pigment | 588 | 235 | 2.5 |

Note:
[*1]Shear rate of 19.2 sec$^{-1}$.
[*2]Shear rate of 192 sec$^{-1}$.

The paste comprising the plasma irradiated pigment showed a Newtonian flow, which is one of the preferred properties of a base composition.

The paste (100 parts) was diluted with the same alkyd resin as used in the preparation of the paste (90 parts) and a melamine resin "Yuban 128" (manufactured by Mitsui Toatsu Chemicals, Inc.) (45 parts) to obtain a baking type alkyd resin coating composition. Then, the coating composition was diluted with a solvent "Solvesso-100" to obtain a spray coating composition. The diluted composition was spray coated on a tin plate (0.3 mm×50 mm×150 mm) and baked at 140° C. for 30 minutes. Specular gloss at an angle of 20° and sharpness of the coating film were measured by means of a glossmeter "Murakami GM-3M" and by visual estimation, respectively. The results are shown in Table 2.

TABLE 2

|  | Gloss | Sharpness |
|---|---|---|
| Plasma irradiated pigment | 90 | Good |
| Non-irradiated pigment | 75 | Poor |

As understood from the results shown in Table 2, with the plasma irradiated pigment, a coating film having better gloss and sharpness can be obtained.

EXAMPLE 2

In the same manner as in Example 1, an organic pigment "Phostaperm Yellow H-3G" (manufactured by Hoechst) was irradiated with low-temperature plasma. A mixture of the plasma irradiated pigment (20 parts), an acrylic resin (acid value, 13; hydroxyl value, 65; solid content, 50%) (60 parts) and methyl isobutyl ketone (20 parts) were ground by means of an SG mill for 3 hours to obtain a grinding paste.

For comparison, a grinding paste was prepared in the same manner as above but using "Phostaperm Yellow H-3G" which had not been irradiated with plasma, in place of the plasma irradiated pigment.

In each paste (100 parts), the same acrylic resin as used in the preparation of the paste (108 parts) and a melamine resin "Yuban 128" (45 parts) were added to obtain a baking type acrylic resin coating composition. The coating composition was diluted with a solvent to obtain a spray coating composition, and it was spray coated on a tin plate of the same size as used in Example 1 and baked in the same manner as in Example 1. The specular gloss and sharpness of the coating film were measured in the same manner as in Example 1. The results are shown in Table 3.

TABLE 3

|  | Gloss | Sharpness |
| --- | --- | --- |
| Plasma irradiated pigment | 92 | Good |
| Non-irradiated pigment | 76 | Poor |

EXAMPLE 3

In the same manner as in Example 1, an organic pigment "Novaoperm Orange HL-70" (manufactured by Hoechst) was irradiated with low-temperature plasma. The pigment as irradiated above or, for comparison, one which had not been irradiated (6 parts), was mixed with a polyester resin "Finedick M-6170" (manufactured by Dainippon Ink and Chemicals, Inc.) (60 parts) and an epoxy resin "Epikote 1004" (manufactured by Shell Chemicals) (40 parts) and dry blended. Thereafter, the mixture was melt blended at 100° C. by means of a kneader ("Busco Kneader" manufactured by Bus), cooled and ground to obtain a powdery composition in which the particle size was not larger than 50 microns. The composition was electrostatically coated on the same tin plate as used in Example 1 to obtain a coating film of 50 microns in thickness, and baken at 170° C. for 30 minutes. The specular gloss and sharpness of the coating film were measured in the same manner as in Example 1. The results are shown in Table 4.

TABLE 4

|  | Gloss | Sharpness |
| --- | --- | --- |
| Plasma irradiated pigment | 90 | Good |
| Non-irradiated pigment | 82 | Poor |

EXAMPLE 4

An organic pigment "Cinquasia Red Y" was irradiated with low-temperature plasma by applying an alternating current of 10 KV in air by means of a "Practive Line" (manufactured by Sankyo Dengyo K.K.). The pigment as irradiated above or, for comparison, one which had not been irradiated (20 parts), was mixed with the same modified alkyd resin as used in Example 1 (40 parts) and a solvent "Solvesso-100" (manufactured by Esso Standard) (40 parts), and the mixture was ground by means of an SG mill for 3 hours to obtain a grinding paste. The viscosity of the paste was measured in the same manner as in Example 1. The results are shown in Table 5.

TABLE 5

|  | Viscosity*1 (cp) | Viscosity*2 (cp) | Viscosity*1/Viscosity*2 |
| --- | --- | --- | --- |
| Plasma irradiated pigment | 128 | 74.2 | 1.7 |
| Non-irradiated pigment | 588 | 235 | 2.5 |

Note:
*1 Shear rate of 19.2 sec$^{-1}$.
*2 Shear rate of 192 sec$^{-1}$.

With the irradiated pigment, the viscosity of the paste decreased, and the paste showed Newtonian flow and had good dispersing properties.

To the paste (100 parts), the same alkyd resin as used in Example 1 (90 parts) and the same melamine resin as used in Example 1 (45 parts) were added to obtain an alkyd resin coating composition. The obtained composition was diluted and spray coated on a tin plate in the same manner as in Example 1. The specular gloss and sharpness of the coating film were measured in the same manner as in Example 1. The results are shown in Table 6.

TABLE 6

|  | Gloss | Sharpness |
| --- | --- | --- |
| Plasma irradiated pigment | 91.7 | Good |
| Non-irradiated pigment | 75 | Poor |

What is claimed is:

1. A pigment-containing base composition comprising at least one organic pigment irradiated with low-temperature plasma and at least one polar solid or liquid vehicle, said pigment having been irradiated with said plasma before adding said vehicle.

2. The composition according to claim 1, wherein the content of the irradiated pigment is from 0.5 to 60% by weight based on the weight of the composition.

3. The composition according to claim 1, which further comprises at least one pigment not irradiated with low-temperature plasma.

4. The composition according to claim 3, wherein the amount of the non-irradiated pigment based on the combined amount of the irradiated pigment and the non-irradiated pigment is not more than 90% by weight.

5. The composition according to claim 1, wherein the pigment is selected from the group consisting of azo-pigments, polycondensed azo-pigments, metal-complex azo-pigments, benzimidazolone pigments, quinacridone pigments, perylene pigments, phthalocyanine pigments, thioindigo pigments, anthraquinone pigments, anthrapyridine pigments, anthanthrone pigments and pyranthrone pigments.

6. The composition according to claim 1, wherein the polar solid vehicle is a resin selected from the group consisting of polyester resins, alkyd resins, vinyl resins, urethane resins, epoxy resins, polyamide resins, melamine resins and urea resins.

7. The composition according to claim 1, wherein the polar liquid vehicle is a solvent selected from the group consisting of alcohols, esters, ketones, 2-nitropropane, methylene chloride, dimethyl formamide and water.

8. The composition according to claim 1, which further comprises at least one non-polar organic pigment and/or at least one non-polar solid or liquid vehicle.

9. The composition according to claim 1, wherein the plasma is produced from high frequency, microwave, direct current or alternating current.

10. The composition according to claim 1, wherein the discharge mode of the plasma is glow discharge, corona discharge or boxer charger.

* * * * *